United States Patent Office 3,362,935
Patented Jan. 9, 1968

3,362,935
VINYLPHENYL - PERFLUOROALKYL - PROPANE-
DIONES AND POLYMERS DERIVED THERE-
FROM
Ted R. Norton, Midland, Mich., assignor to The Dow
Chemical Company, Midland, Mich., a corporation of
Delaware
No Drawing. Filed Sept. 3, 1965, Ser. No. 485,106
10 Claims. (Cl. 260—63)

This invention is concerned with novel compositions characterized as fluorinated vinylphenyl-β-diketones and to polymeric products obtained therefrom.

The novel monomeric fluorinated vinylphenyl-β-diketones of the invention may be more precisely designated as 1-(vinylphenyl)-3-perfluoroalkyl - 1,3 - propanediones and may be represented by the formula

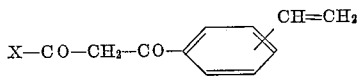

wherein X represents a perfluoroalkyl radical having 1 to 3 carbon atoms, such as trifluoromethyl, pentafluoroethyl or heptafluoropropyl.

In accordance with this invention, it has been discovered that the novel vinylphenyl-perfluoroalkylpropanediones may be copolymerized with a crosslinking monomer having two or three $CH_2{=}C{<}$ groups or with a monomer having one $CH_2{=}C{<}$ group and also containing a water-solubilizing group, as hereinafter described, or with both such monomers to produce novel polymers useful in the chelation of a variety of metal ions, particularly metal ions having a valence of two or greater. Such copolymers have shown utility in selective separations of metal ions and are particularly useful in such separations under strongly acid conditions.

The preparation of the vinylphenyl-perfluoroalkylpropanediones of this invention is advantageously carried out by mixing an ar-vinyl-acetophenone with an alkali metal alkoxide, e.g., sodium alkoxide and a lower alkyl ester of the formula

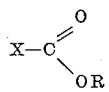

wherein R represents a lower alkyl group having up to 5 carbon atoms and X has the aforementioned significance and the mixture is heated for a period of time to accompl'sh a condensation reaction. The intermediate so formed is thereafter mixed with ice and a mineral acid and the resulting mixture separated by decantation and extraction to obtain the desired vinylphenylperfluoroalkyl-propanedione product.

In practice, it is convenient to carry out the reaction for the production of the monomeric vinylphenyl-perfluoroalkyl-propanedione compounds in an inert, organic solvent such as a liquid aromatic hydrocarbon. The condensation reaction proceeds readily when the reactants and solvent are mixed together and heated at a temperature of from about 50° to about 90° C. for a short period usually ranging between 10 and 30 minutes. It is generally preferred to employ the reactants in substantially equimolar proportions (up to 120% of theory of either reactant) since they react in equimolar proportions. The vinylphenyl-perfluoroalkyl-propanedione monomer compounds are crystalline solids, soluble in a variety of organic solvents and relatively insoluble in water. They may be obtained in a more pure state by recrystallization from an organic solvent.

The novel polymers of the invention include the homopolymers of the above-described vinylphenylperfluoroalkyl-1,3-propanediones, copolymers of two or more of sa'd propanediones, copolymers of one or more of said propanediones with one or more hydrophilic monomers, and copolymers of one or more of said propanediones with a hydrophilic monomer and a crosslinking agent.

Suitable hydrophilic monomers are compounds containing a $CH_2{=}C{<}$ group capable of undergoing vinyl polymerization, which compounds are water soluble or capable of being readily solubilized, as for example, by salt formation. Representative of such hydrophilic monomers are acrylic acid, methacrylic acid, itaconic acid, acrylamide, methacrylamide, 2-hydroxyethyl acrylate, 2-hydroxyethyl methacrylate, 2-sulfoethyl methacrylate and salts thereof, salts of 2-aminoethyl methacrylate, trialkyl vinylbenzyl-ammonium salts, styrenesulfonic acid and its salts, vinylbenzylsulfonic acid and its salts, vinyl pyrolidone, vinyl oxazolidinone, vinyl morpholinone, and vinyl pyridine salts.

Suitable crosslinking agents include compounds containing two or more $CH_2{=}C{<}$ groups capable of undergoing vinyl polymerization, such as divinylbenzene, divinyltoluene, alkylene diacrylates and alkylene dimethacrylates.

The polymeric compounds of the invention are prepared by subjecting a polymerizable composition comprising an appreciable proportion of at least one vinylphenyl-perfluoroalkyl-1,3-propanedione, with or without a suitable proportion of one or more of the above-described hydrophilic monomers and/or crosslinking agents, to conditions conducive to polymerization. Any of the common methods may be used, i.e., the polymerization can be carried out in mass, that is, in substantial absence of any diluent, in solution in a solubilizing liquid, or while suspended or emulsified in non-solvent liquid media. The polymerization of the ethylenically unsaturated monomer composition is accelerated by heat and is catalyzed by exposure to activating radiations and by contact with or heating with free radical catalysts such as $\alpha,\alpha'$-azobisisobutyronitrile or peroxy compounds such as cumene hydroperoxide, tertiary butyl peroxide and hydroperoxide and potassium persulfate.

In copolymers of one or more of the monomeric propanedione compounds of the invention with a hydrophilic monomer, the finished copolymer may contain from about 30 percent to substantially 100 percent of polymerically combined units of the vinylphenyl-perfluoroalkyl-1,3-propanediones and correspondingly, from a very small proportion up to about 70 percent of polymerically combined units of the hydrophilic monomer. Crosslinked copolymers, in addition to the above described proportions of combined propanedione compound and hydrophilic monomers, may contain in polymerically combined form from a very small quantity of the order of 0.2 percent up to about 5 percent of cross-linking agent such as divinylbenzene or the like.

*Example 1*

50 ml. of dry toluene and 5.4 g. (0.1 mole) of sodium methoxide were placed in a dry 300-ml. Erlenmeyer flask and 14.2 g. (0.1 mole) of ethyl trifluoroacetate was added thereto rapidly. The addition of the latter reactant dissolved the sodium methoxide and the temperature of the mixture rose autogenously to 40°–50° C. To the resulting mixture 14.6 g. (0.1 mole) of 4-vinylacetophenone was added portionwise over a 5-minute period and the resulting solution was then heated to a temperature of about 85° C. and maintained at such temperature for a period of 15 minutes to complete the condensation reaction. The solution so produced was poured into a mixture of 100 g. of chipped ice and 15 ml. (0.18 mole) of concentrated hydrochloric acid.

The resulting mixture separated into an aqueous layer and a supernatant organic layer. The organic layer was separated and washed with about 50 ml. of water containing a small amount of p-methoxyphenol as a polymerization inhibitor. The washed organic material was maintained at a temperature of about 2° C. for about 40 hours, at which time it had separated into 3 layers. The lowest layer, a dark oil amounting to about 8 grams of material, was found to be insoluble in toluene and water and was apparently polymer. The supernatant organic layer was separated from the middle aqueous layer and the toluene solvent evaporated therefrom under vacuum to obtain an oily, crude product in a yield of 20 g. This oily product was dissolved in 50 ml. of warm hexane, the solution was filtered, and the filtrate was maintained at 0° F. for about 16 hours to induce crystallization of the product. The crystallized 4,4,4-trifluoro-1-(p-vinylphenyl)-1,3-butanedione product was recovered by filtration and washed with a small amount of cold hexane. This product was obtained in form of buff-colored crystals melting at 36°–38.5° C. After further recrystallization from hexane, including an activated charcoal treatment of the solution, the trifluorovinyl-phenyl-butanedione was obtained in the form of pale yellow crystals melting at 39°–40° C. and having a content, by weight, of 59.63% carbon, 3.77% hydrogen and 24.0% fluorine as compared to theoretical values of 59.55% carbon, 3.74% hydrogen and 23.6% fluorine, calculated for 4,4,4-trifluoro-1 - (p-vinylphenyl)-1,3-butanedione. The infrared spectrum of the recrystallized product was found to be consistant with the assigned structure.

When an equivalent proportion of methyl or ethyl pentafluoropropionate or methyl or ethyl heptafluorobutylate is substituted for the ethyl trifluoroacetate, the homologous pentanedione and hexanedione products are obtained. Also o-vinylacetophenone or mixtures of o- and p-vinylacetophenone can be substituted in place of p-vinylacetophenone.

*Example 2*

4.6 g. (0.019 mole) of 4,4,4 - trifluoro - 1 - (p - vinylphenyl)-1,3-butanedione, 0.2 g. (0.0015 mole) of divinylbenzene, 0.5 g. (0.0013 mole) of the tributylamine salt of 2-sulfomethyl methacrylate and 0.015 g. of azo-bis-isobutyronitrile were mixed together in a glass vial and melted under an atmosphere of nitrogen. After thorough purging with nitrogen, the vial was sealed and heated in a temperature of 60° C. for 15 hours. The mixture reacted to produce a hard, horn-like polymeric product. The latter was ground in a mortar until all of the product would pass through a 20 U.S. mesh sieve. This polymeric product or resin did not swell when maintained in contact with water for 20 hours. However, said resin swelled immediately when wetted with acetone.

*Example 3*

4.84 g. (0.02 mole) of 4,4,4-trifluoro-1-(p-vinylphenyl)-1,3-butanedione, 2.71 g. (0.0071 mole) of the tributyl-ammonium salt of 2-sulfoethyl methacrylate and 0.2 g. (0.0016 mole) of divinylbenzene were blended together and 0.015 g. of azo-bis-isobutyronitrile was added thereto. The divinylbenzene was added in the form of 0.44 ml. of a 50% solution of divinylbenzene and diethylbenzene. The resulting mixture was maintained in a vial as in Example 2. The vial was heated sufficiently to melt the ingredients. Air was then purged from the vial with nitrogen and the vial was then sealed and heated at a temperature of about 60° C. for 27 hours to complete the polymerization reaction. By visual observation the polymerization appeared to be complete by the end of three hours of heating, but heating was continued overnight to assure completion. The hard, horny product was removed from the vial and ground in a mortar to give 5.9 g. of −20 +50 U.S. mesh product and 1.6 g. of −50 +325 S. mesh product, for a total recovery of 97%. The coarser part of the resinous polymer was placed in a 50-ml. burette and the resulting column of resin was tamped and then wetted and washed with polar solvents as follows: (A) wet with methanol, (B) washed with methanol containing HCl until 60 percent of the tributylamine was removed and thereafter washed with methanol, and (C) washed with water. The swelling resulting from each of these steps, based on the original volume of resin employed, is shown in the following table.

| Washing or wetting step: | Percent increase in volume |
|---|---|
| A | 95 |
| B | 70 |
| C | 40 |

From the foregoing results, it was concluded that the increased proportion of the hydrophilic sulfoethyl methacrylate constituent in the above polymer provided access for polar solvents, including water, to the interior of the resulting polymeric resin product.

Through the water-wet coarser fraction of the resinous polymer in the 50-ml. burette was slowly passed 172 ml. of m/10 cupric acetate dissolved in methanol to give a 70% of theory $Cu^{++}$ pick up (assuming ½ $Cu^{++}$ per $-SO_3H$ and 1 $Cu^{++}$ per $\beta$-diketone equivalent). The $Cu^{++}$ was eluted with 1 N HCl (92.5% recovery).

What is claimed is:

1. A 1-(vinylphenyl)-3-perfluoroalkyl - 1,3 - propanedione having the formula

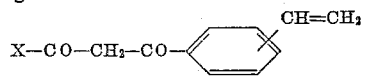

wherein X is a perfluoroalkyl group having 1 to 3 carbon atoms.

2. 4,4,4-trifluoro-1-(p-vinylphenyl)-1,3-butanedione.

3. A resinous polymer of one or more 1-(vinylphenyl)-3-perfluoroalkyl-1,3-propanediones wherein the perfluoroalkyl substituents have 1 to 3 carbon atoms.

4. A resinous homopolymer of 4,4,4-trifluoro - 1 - (p-vinylphenyl)-1,3-butanedione.

5. A resinous copolymer of at least 30 mole percent of one or more 1-(vinylphenyl)-3-perfluoroalkyl-1,3-propanediones with a balance of a combined hydrophilic ethylenically unsaturated monomer, wherein the perfluoroalkyl substituents have 1 to 3 carbon atoms.

6. A resinous polymer as claimed in claim 5, wherein the vinylphenyl-perfluoroalkyl-propanedione is 4,4,4-trifluoro - 1 - (p - vinylphenyl) - 1,3 - butanedione and the hydrophilic monomer is the tributyl - ammonium salt of 2-sulfoethyl methacrylate.

7. A resinous copolymer of at least 30 mole percent of one or more 1-(vinylphenyl-3-perfluoroalkyl-1,3-propanediones, 0.2 to 5 mole percent of a crosslinking monomer having a plurality of $CH_2=C<$ groups per mole with a balance of combined hydrophilic ethylenically unsaturated monomer, wherein the perfluoroalkyl substituents have 1 to 3 carbon atoms.

8. A resinous polymer as in claim 7 wherein the vinylphenyl-perfluoroalkyl-propanedione is 4,4,4-trifluoro-1-(p-vinylphenyl)-1,3-butanedione, the crosslinking monomer is divinylbenzene and the hydrophilic monomer is the tributylamine salt of 2-sulfoethyl methacrylate.

9. A process for making a 1-(vinylphenyl)-3-perfluoroalkyl-1,3-propanedione having the formula

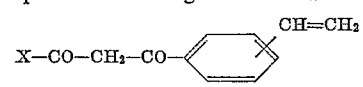

wherein X is a perfluoroalkyl group having 1 to 3 carbon atoms by reacting an ar-vinyl-acetophenone with a substantially equimolar proportion of a lower alkyl ester of the formula X—CO—OR wherein X has the significance previously given and R is a lower alkyl group having up to 5 carbon atoms in the presence of a condensing amount of an alkali metal alkoxide, at a temperature of ca. 50° to ca. 90° C. until condensation is substantially complete, acidifying the medium at a temperature of ca. 0° C. and recovering product 1-(vinylphenyl)-3-perfluoroalkyl-1,3-propanedione therefrom.

10. The process as claimed in claim 9, wherein 4-vinylacetophenone is reacted with ethyl trifluoroacetate in the presence of sodium methoxide in toluene as reaction medium at a reaction temperature of about 85° C.

No references cited.

WILLIAM H. SHORT, *Primary Examiner.*

L. LEE, *Assistant Examiner.*